Figure 1:
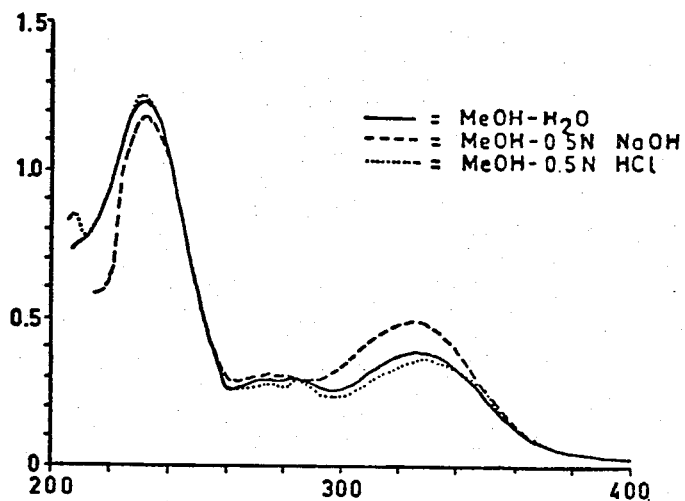

United States Patent [19]

Vos et al.

[11] 3,927,211

[45] Dec. 16, 1975

[54] ANTIBIOTIC MYC 8003 AND PROCESS FOR PRODUCING SAME

[75] Inventors: Cornelis Vos, Pijnacker; Jacobus Den Admirant, Delft, both of Netherlands

[73] Assignee: Gist-Brocades N.V., Delft, Netherlands

[22] Filed: Mar. 26, 1973

[21] Appl. No.: 344,610

Related U.S. Application Data

[63] Continuation-in-part of Ser. No. 170,516, Aug. 10, 1971, abandoned.

[30] Foreign Application Priority Data

Aug. 14, 1970 United Kingdom............... 39367/70

[52] U.S. Cl. ............................................... 424/122
[51] Int. Cl............................................ A61k 21/00
[58] Field of Search.................... 424/122; 195/80 R

[56] References Cited

OTHER PUBLICATIONS

Chemical Abstracts 79:1301s (1974).

*Primary Examiner*—Jerome D. Goldberg
*Attorney, Agent, or Firm*—Hammond & Littell

[57] ABSTRACT

An antibiotic being a yellow, salt-forming weak acid, and its non-toxic, pharmaceutically acceptable salts produced by a microorganism called *Streptomyces ramocissimus*, a sample of which is deposited in the collection of "Centraal Bureau voor Schimmelcultures" at Baarn, The Netherlands, under No. CBS 190.69, or mutants thereof, which antibiotic possesses growth-promoting properties and is especially useful to be added to animal feed although the antibiotic may also be used for therapeutic purposes.

3 Claims, 6 Drawing Figures

ANTIBIOTIC MYC 8003 AND PROCESS FOR PRODUCING SAME

PRIOR APPLICATION

This application is a continuation-in-part of copending, commonly assigned application Ser. No. 170,516 filed Aug. 10, 1971, now abandoned.

OBJECTS OF THE INVENTION

It is an object of the invention to provide a novel antibiotic having growth-promoting properties.

It is another object of the invention to provide a novel process for the preparation of the novel antibiotic.

It is a further object of the invention to provide novel growth-promoting compositions and particularly novel animals feeds.

It is an additional object of the invention to provide a novel method of promoting the growth of warm-blooded animals.

These and other objects and advantages of the invention will become obvious from the following detailed description.

THE INVENTION

The new antibiotic, referred to as MYC 8003 (now called mocimycin), is of special value for its growth-promoting properties when administered to live-stock. It also has a considerable activity in vitro against organisms of the Mycoplasma genus (pleuropneumonia like organisms) and is active against some bacteria, for example Actinobacillus equuli. It is obtained from culture media of the microorganism which is characterized in detail hereafter belonging to the genus Streptomyces. The microorganism producing the antibiotic has not been described hitherto, and a specimen of it has been deposited in the collection of "Centraal Bureau voor Schimmelcultures" at Baarn, The Netherlands, where it has been given the number CBS 190.69 and is available to the public.

The species of Streptomyces described herein and identified as Streptomyces MYC 8003 includes all strains of Streptomyces which produce antibiotic MYC 8003 and which cannot be definitely differentiated from the strain CBS 190.69 and its subcultures, including mutants and variants. By the term "mutants" as used herein there is intended mutants produced from the described organism by various means such as chemical mutagenic agents, ultra-violet radiation, X-radiation, phage exposure and the like. The properties of antibiotic MYC 8003 are described herein and after these properties are known it is easy to differentiate the strains producing antibiotic MYC 8003 from others. The novel microorganism has been called *Streptomyces ramocissimus*.

The antibiotic of the present invention is a weak acid and forms non-toxic, pharmaceutically acceptable salts, which are antibiotically active, such as alkali metals, e.g. sodium, and potassium, ammonium and amine salts. It has the following physico - chemical properties Solubility:

The solubility of the antibiotic is good in chloroform, methyl isobutyl ketone, butyl acetate, ethyl acetate, acetone, methanol and alkaline solutions. The solubility is poor in carbon tetrachloride and benzene, and the antibiotic is insoluble in diethyl ether, petroleum ether, water and acid solutions.

Stability:

Tests have shown that, over periods of about 4 hours at ambient temperature, the antibiotic when dissolved in 50 % aqueous methanol is stable within a pH range of 3 to 12. The solid antibiotic stored at 25°C and 37°C at low relative humidities shows no loss in activity for at least 5 months. It is stable for 3 months at 25°C and 100 % relative humidity and for 2 months at 37°C and 100 % relative humidity.

Reactions on possible function groups:

TABLE I

| Reagent | Result |
| --- | --- |
| Conc. Sulfuric acid | dissolution and formation of a red colour |
| Aromate test (AlCl$_3$ + chloroform) | slightly positive |
| Fehling's reaction (aldehydes) | negative |
| Tollens' reaction (aldehydes) | negative |
| Molisch reaction (saccharides) | negative |
| Anthron reaction (saccharides) | negative |
| Biuret reaction (proteins) | negative |
| Folin L reaction (proteins + amino acids) | negative |
| Pauly reaction (amino acids + phenols) | dark brown colour |
| FeCl$_3$ reaction (enols + phenols) | dark red colour and turbidity |
| Bromination in CHCl$_3$ | positive |
| Bromination in water | precipitation due to acid formation |

Optical rotation:

$[\alpha]_D^{22} = -60°$ (1 % methanolic solution)

Melting point:

The antibiotic does not have a sharp melting point or melting range. At 135°C, a gas production takes place, while the antibiotic softens. At about 152°C, gas is again produced. At 164° – 174°C, the antibiotic is molten.

Ultra-violet Spectrum:

The antibiotic shows a specific spectrum with maxima at a wave-length of 233, 276, 286 and 327 nm. At different pH values, different spectra are obtained as shown in FIG. 1. In FIG. 1, the solid line stands for a 13 mg/l solution of the antibiotic in a mixture of equal amounts of methanol and water and the broken line stands for a similar solution, except that the water is replaced by 0.5N sodium hydroxide, while the dotted line stands for a similar solution except that the water is replaced by 0.5N hydrochloric acid.

Figure 2:
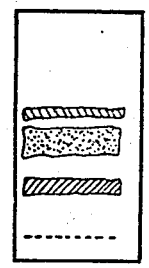
Figure 5:
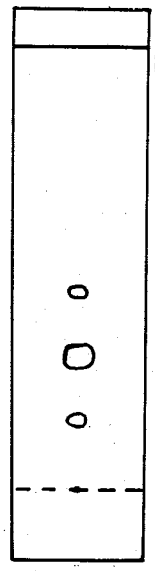
Figure 6:
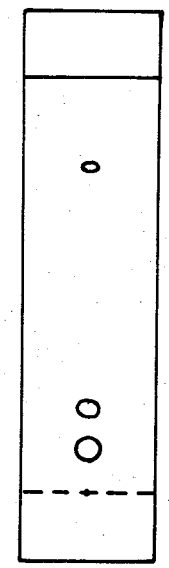

Thin-layer chromatography of the antibiotic reveals the presence of three compounds. By two-dimensional chromatography where the second elution was carried out at least 12 hours after the first, it was found that these three components are in equilibrium with each other. The results obtained with three solvent systems are given in FIGS. 2, 5 and 6.

The first chhromatogram (FIG. 2) has been made on silica gel with the solvent mixture consisting of acetone, ethyl acetate and water (12:8:1). The dotted line indicates the start, and the spots 1, 2 and 3 indicate the components.

The second chromatogram (FIG. 5) is obtained with the solvent system methyl isobutyl ketone, acetone and water (50:45:5) and the third (FIG. 6) with benzene, ethanol and 33 % ammonia (65:40:9). For the chromatograms of FIGS. 5 and 6, Kieselgel F 254 plates (Merck) were used. The spots are detected by using UV light of a short wave length giving dark spots on a fluorescing back ground. The $R_f$ values obtained are: first component (chief component) 0.5, 0.29 and 0.10, second component: 0.7, 0.44 and 0.20 and third component: 0.3, 0.16 and 0.76, respectively.

Figure 3:
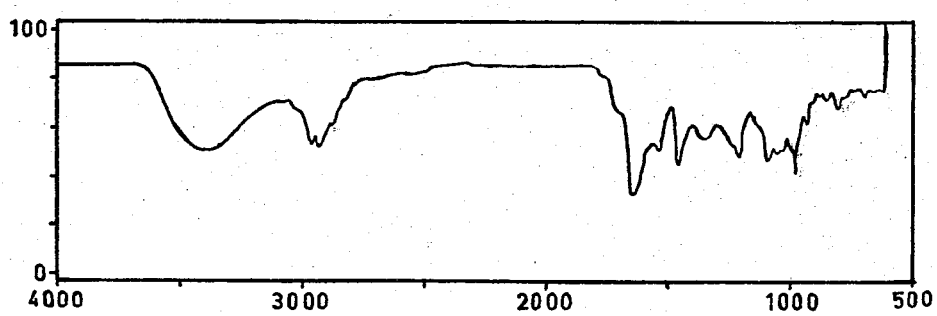

Infra-red Spectrum:

The I.R. spectrum in KBr of the antibiotic is shown in FIG. 3. The principal absorption bands are 812, about 860, 940, 985, 1092, 1215, 1340-1380, 1460, 1540, 1640, 2933, 2969, about 3370 cm$^{-1}$.

The IR spectrum of a solution in chloroform shows the following absorption maxima: 865, 940, 990, 1045, 1077, 1095, 1360, 1460, 1520, 1658, 2880, 2940, 2973 and 3448 cm$^{-1}$.

Figure 4:
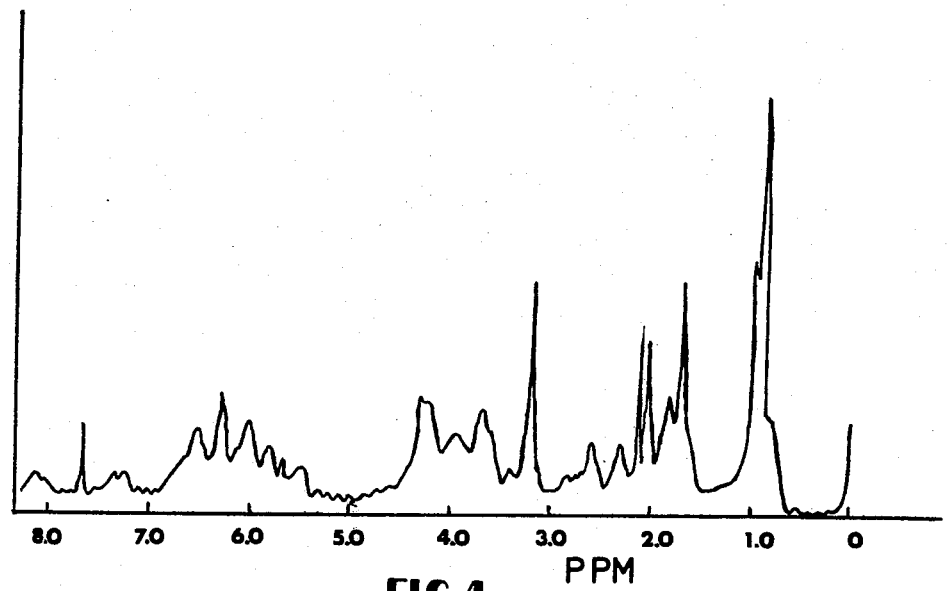

PMR Spectrum:

The PMR spectrum of MYC 8003 was taken in a mixture of hexadeutero-dimethylsulfonamide and CDCl$_3$ and measured at 60 Mc and is shown in FIG. 4. $\delta$ values are indicated in ppm and tetramethylsilane was used as a reference.

Elementary Analysis:

Average values found are: C 63.8% H 7.6% N 3.5% O (by difference) 25.1%.

Molecular Weight:

The molecular weight determination was carried out by means of isothermic distillation. Two solutions, one of the antibiotic in acetone and the other of azobenzene (as reference) in acetone, were placed separately in a closed and evacuated system. Because of the difference in vapor tension above the solutions, the vapor moves until an equilibrium is reached when the solutions have equal molarities. The method was carried out at a constant temperature of 23°C. The molecular weight calculated for the antibiotic was 714. A solution of the antibiotic in 50% aq.MeOH titrated by 0.1N NaOH gives a neutralization equivalent of 817.

Microbiological Activity:

The microbiological activity of the antibiotic preparation towards a number of microorganisms has been determined by a micro liquid serial dilution test.

A stock solution of the test compounds at a concentration of 200µg/ml in 0.05 molar phosphate buffer at a pH of 6.5 was prepared and serial 1:1 dilutions were made with a liquid medium inoculated with the test organism, using conventional glass spot-test plates. The plates were incubated 18 hours at 30°C or 37°C. The minimum inhibitory concentration (MIC) which is the smallest concentration of compound completely inhibiting the growth of the test organism is read and calculated in µg/ml. The results are given in Table II.

TABLE II

| Organism tested | Minimum inhibitory concentration µg/ml |
|---|---|
| Bacillus subtillis ATCC 6633 | 50 |
| Bacillus cereus ATCC 9139 | 0.3 |
| Staphylococcus aureus A 55 (ATCC 65388) | 100 |
| Staphylococcus aureus A 321 | 100 |
| Staphylococcus aureus A 335') | 100 |
| Staphylococcus aureus L 160a') | >200 |
| Streptococcus haemolyticus A 266 | 2 |
| Streptococcus faecalis L 80 | >200 |
| Streptococcus faecalis A 306 | 1 |
| Micrococcus flavus A 54 | 4 |
| Sarcina lutea ATCC 9341 | 25 |
| Diplococcus pneumoniae A 188 | 1 |
| Brucella melitensis A 488 | 1 |
| Pasteurella multocida A 723 | 4 |
| Salmonella dublin P 43 | >100 |
| Salmonella typhimurium R 127 | >100 |
| Escherichia coli U 20 | >100 |
| Escherichia coli M | >100 |
| Escherichia coli NCTC 8196 | 50 |
| Erwinia carotovora W 9 | 6 |

TABLE II-continued

| Organism tested | Minimum inhibitory concentration µg/ml |
|---|---|
| Pseudomonas aeruginosa L 94 | >100 |
| Pseudomonas aeruginosa 2396") | >100 |
| Proteus rettgeri A 821 | >100 |
| Proteus mirabilis H 3 | 50 |
| Proteus mirabilis L 93 | 100 |
| Proteus morganii 2241") | 100 |
| Haemophilus influenzae A 773 | 2 |
| Actinobacillus equuli T 3 | 1.5 |
| Candida albicans A 7 | >100 |
| Candida parapsilosis A 952 | >100 |
| Torulopsis glabrata A 420 | >100 |
| Saccharomyces cerevisiae D 160 | >100 |
| Trichophyton mentagrophytes R 177 | >100 |
| Aspergilus niger D 184 | >100 |
| Lactobacillus acidophilus D 218 | >100 |
| Clostridium welchii A 738 | 10 |
| Vibrio coli 1846 | 100 |
| Streptococcus agalactiae A 732 | 0.9 |
| Streptococcus disgalactiae A 730 | 0.6 |
| Mycoplasma gallisepticum K 514 | 0.1 |
| Mycoplasma synoviae A 2082 | 1 |
| Mycoplasma suipneumoniae A 2174 | 1 |
| Mycoplasma hyorhinus A 2230 | 3 | wherein ') indicates penicillinase-producer; ") indicates recently isolated hospital strain.

The Table shows that the antibiotic possesses a high activity against Mycoplasma gallisepticum, but almost no activity against a number of human-pathogenic microorganisms. There is no activity again Mycoplasma gallisepticum in vivo.

Toxicity:

The toxicity of the antibiotic has been studied in various animals. The acute toxicity is very low; a dose of 1,000 mg/kg i.p. does not kill mice and oral administration to rats and chickens at concentrations up to 0.1% in the diet for three months does not result in any undesired pharmacological effect.

Application:

The new antibiotic of the invention has been found to be especially useful as a growth promoting agent for livestock, e.g. cattle, pigs and poultry. The growth promoting agent can be administered in the usual manner, for example, as an additive in animal food at a daily rate of 1 to 100 mg/kg, preferably 2.5 to 20 mg/kg.

The antibiotic may also have therapeutical value for diseases caused by certain intestinal microorganisms, such as Vibrio coli, Clostridium welchii.

Description of the microorganism:

The microorganism Streptomyces ramocissimus (CBS 190.69), which produces the antibiotic of the present invention is characterised by the following description, in which, for the determination, use has been made of "Systematik der Streptomyceten" by R. Hütter (1957) and the "International Journal of Systematic Bacteriology" (1968), vol. 18 no. 2) with the rules for description prescribed by the International Streptomyces Project (hereinafter abbreviated to ISP).

A. The vegetative mycelium.

The growth on most growth media is good. The colonies possess the characteristic appearance of Actinomycetes and are formed as leather-like, somewhat plied colonies. Normally, the color of the colonies is not very characteristic as it varies from substantially colorless via light gray and light beige to light yellow, except on media on which the colonies are colored brown to dark brown by formation of melanine (malt peptone agar, brain-heart infusion agar).

B. The aerial mycelium.

On most media, an aerial mycelium is hardly or not visible macroscopically. On some media, such as yeast extract-malt extract agar, oat meal agar and, especially, inorganic salt-starch agar, however, aerial mycelium is formed in abundance. At first, such a mycelium is white, but it turns dark gray in good developments, and is built up from often rather short, irregularly branched hyphes having spore chains on short side axes in the form of simple loops or primitive coils having not more than two, three or four turns (section: Spira). Sometimes, two, three or four of those coils sprout as pseudo verticils from substantially the same spot on the main axes. Other spore chains sprout as primitive coils directly from the substrate mycelium (in a way similar to *Retinaculum-Apertum*). In addition, many sub-globose bodies are often visible in the aerial mycelium, probably due to an amount of spores from a primitive coil surrounded by a film of liquid.

C. The conidia.

In the spiral-like hyphes, strings of mostly over ten, somewhat elliptic conidia are formed. The surface of the conidia is smooth. The sizes are rather variable, but the average sizes are about 0.9 to 1.3 $\mu$.

D. Influence of temperature on growth.

The growth is slow at 20°C., moderate at 26°C., good between 30°C. and 37°C, and fairly good at 40°C. Growth stops over 42°C (mesophyl).

E. Physiological properties.

The physiological properties are shown in the following Table III.

TABLE III

| Property | Diagnostic medium | Physiological reactions |
|---|---|---|
| Melanine formation | Melanine Medium according to Shinobu, 1958 (ISP med. 7) | highly positive |
| H$_2$S formation | "Bacto-Peptone Yeast Extract Iron agar" | highly positive |
| | "Triple Sugar Iron agar" from Difco | highly positive |
| Gelatin liquefaction | Plain Gelatin | liquefield completely after 16 days at 30°C. |
| Nitrate reduction | Nitrate Reduction Medium according to Waksman | highly positive |
| Diastatic action | Starch agar | highly positive |
| Coagulation and Peptonisation of milk | Litmus milk | after 16 days coagulated and, for the greater part, peptonised (pH 7.9) |

In Tables IV and V a survey is given of the growth and the appearance of the microorganism *Streptomyces ramocissimus* on a number of substrates.

TABLE IV

Appearance of the microorganism after 16 days' growth at 30°C.

| Substrate | Growth | Soluble pigment | Aerial mycelium | Vegetative mycelium |
|---|---|---|---|---|
| Malt peptone agar | good | dark brown | none | chocolate brown colored colonies |
| Emerson's agar | good | brown | none | light brown to beige colonies |
| Nutrient agar | good | brown | none | light brown yellow to yellow beige colonies |
| Nutrient agar + 1% soluble starch | good | brown | none | light brown yellow to yellow beige colonies |
| Oat meal agar | good | light brown | initially | light beige to yellow beige |
| Starch agar | good | light yellow | none | light yellow to gray |
| Potato-glucose agar | good | dirty dark brown | none | rather deeply plied, dark brown colonies |
| Czapek-glucose agar | fairly good | none | none | light yellow to gray |
| Czapek-saccharose agar | fairly good | none | none | light grayish white |
| Czapek-glycerol agar | fairly good | none | none | light gray |
| Glucose asparagine agar | good | none | none | light yellow, merging colonies |
| Glycerol asparagine agar | good | none | very scarce at the edge of the colonies | weak light greenish gray |
| Glucose calcium malate agar | good | none | none | very light yellow to white |
| Sodium citrate agar | moderate | none | none | gray-beige |
| Brain-heart infusion agar | moderate | black brown | none | chocolate brown |
| Küster-Williams agar (viz. Nature 202 1964 p. 928) | good | light brown | very scarce, gray-white | very light greenish beige |
| Bennett's agar | good | light brown | very scarce, white | light brown to beige |
| Potato slices | good | almost black | none | black brown, highly plied colonies |

TABLE V

The microorganism after 13 day's growth on media prescribed by ISP.

| Substrate | Growth | Soluble pigment | Aerial mycelium | Vegetative mycelium |
|---|---|---|---|---|
| A. at 30°C. | | | | |
| Yeast malt extract agar (ISP II) | good | none | rather abundant, white, later on light gray | light brown to beige |
| Oat meal agar (ISP II) | good | none | very scarce, chiefly along the edges | flat, very light yellow to gray colonies having edges growing very deep in the agar |
| Inorganic salts-starch agar (ISP IV) | good | none | abundant, light gray, later on almost black | flat, light gray to very light yellow beige colonies |
| Glycerol asparagine agar (ISP V) | good | none | rather abundant, light gray, later dark gray to almost black | light gray to light yellow gray colonies |
| B. at 37°C. | | | | |
| ISP II | good | none | rather abundant, light gray | colonies having edges growing rather deep in the agar |
| ISP III | good | none | rather abundant, | flat, very light gray to |

| Substrate | Growth | Soluble pig-ment | Aerial mycelium | Vegetative mycelium |
|---|---|---|---|---|
| ISP IV | very good | none | white<br><br>abundant, dark gray, later in certain spots almost black | light yellow gray colonies having edges growing deep in the agar<br>flat, light beige to light yellow beige colonies |
| ISP V | good | none | rather abundant, light gray, later dark gray to almost black | light gray to light yellow colonies |

A comparison of the properties and characteristics of *Streptomyces ramocissimus* CBS 190.69 with those of related strains of Streptomyces, such as *Streptomyces tendae* CBS 432.59, *Streptomyces tendae* CBS 565.68 and *Streptomyces collinus* Ist 301 (ETH 24.318), when grown on media recommended by ISP at 30° and 37°C., makes it apparent that *Streptomyces ramocissimus* is different from those previously known strains of Streptomyces.

The aerial mycelium of *Streptomyces collinus*, under suitable circumstances, may grow to markedly long, little branched hyphes lying more or less horizontally over the colony, along which short, generally loop-formed spore-chains are implanted. This is in great contrast to the aerial mycelium of *Streptomyces ramocissimus* which is markedly short and highly irregularly branched. The colors of the two mycelia are also quite different. The aerial mycelium of *Streptomyces ramocissimus* is gray to dark gray, whereas that of *Streptomyces collinus* is generally white, light yellow or cream-colored to only light gray-colored, and the substrate mycelium, especially when grown on "Basal mineral salts agar media" to which different carbon compounds have been added, is predominantly grayish for *Streptomyces ramocissimus* whereas that of *Streptomyces collinus* is light brown, brown red or even egg-yellow. Differences occur also in the physiological properties in nitrate-reduction, gelatin-liquefaction, the amount of starch hydrolysis and the decomposition of calcium oxalate and oxalic acid. These differences indicate that the microorganism cannot be arranged under *Streptomyces collinus*.

The differences between *Streptomyces ramocissimus* and the two above mentioned *Streptomyces tendae* are less than between *Streptomyces ramocissimus* and *Streptomyces collinus*. For example, the color of the aerial mycelium of *Streptomyces ramocissimus* shows only a small difference with that of *Streptomyces tendae*, while the spore-chains are often bent into hooks or loops. The spore-chains of the examined *Streptomyces tendae*, however, are generally longer than those of *Streptomyces ramocissimus*. The spore-chains of *Streptomyces tendae* generally rise up directly from the agar, whereas, although sometimes observed at the spore-chains of *Streptomyces ramocissimus*, too, the spore-chains of this strain are generally arranged as monopodial side-branches along short aerial hyphes. A more important taxonomical different resides in the formation of a melanoidal pigment on the I.S.P. media 6 and 7 (the melanine medium according to Shinobu and the Peptone yeast extract agar, respectively). The examined *Streptomyces tendae* strains do not form a brown pigment on those media, whereas *Streptomyces ramocissimus* is pronouncedly melanine-positive. Other differences in physiological properties were observed in the following properties:

| | *Streptomyces ramocissimus* | *Streptomyces tendae* |
|---|---|---|
| nitrate reduction | positive | negative |
| liquefaction of gelatin | positive | negative |
| degree of starch hydrolysis | highly positive | weakly positive |
| decomposure of calcium oxalate and oxalic acid | negative | positive |

Based on the above mentioned differences, it is apparent that *Streptomyces ramocissimus* does not belong to *Streptomyces tendae*.

Production of the antibiotic MYC 8003.

According to a feature of the present invention, the new antibiotic is prepared by the process which comprises aerobically cultivating the microorganism *Streptomyces ramocissimus* (CBS 190.69), or antibiotic-producing mutant thereof, in an aqueous nutrient medium containing assimilable sources of carbon, nitrogen and inorganic substances at a temperature between about 20° and about 40°C, preferably between about 28° and 40°C and a pH between about 5 and 9, preferably between about 6.5 and about 8, and separating the antibiotic formed during the cultivation. Fermentation of the microorganism may be carried out with the liquid media containing the usual carbon, nitrogen, phosphorus calcium, iron, sulfur, magnesium, potassium, vitamin and trace-element sources, such as media containing molasses, malt paste, peanut flour, lactose, potato starch, corn steep, and yeast extract.

The separation of the antibiotic from the culture medium can be carried out in several ways. For example, the culture filtrate may be extracted with an organic solvent for the antibiotic such as butanol, chloroform or, preferably, methyl isobutyl ketone whereby the antibiotic is collected in the organic phase. Another method of recovery consists in extraction of the culture as such or at an adjusted pH value (whole broth extraction) with a suitable organic solvent (chloroform, methyl isobutyl ketone, butyl acetate, etc.) Still another method consists in adding a large volume (e.g. 0.5 to 5 times the culture volume) of an organic solvent such as an alcohol or ketone to the culture broth, followed by filtration or centrifugation. From the organic phase the antibiotic may be precipitated by concentration or addition of a poor solvent for the antibiotic such as petroleum ether. The pH for an optimal extraction is about 5 to 8. Purification of the antibiotic may be carried out by chromatography on an $Al_2O_3$ column, partition chromatography, and/or countercurrent distribution, using methyl isobutyl ketone, ethyl acetate or a 1:1 mixture of ethyl acetate and diethyl ether as the mobile phase, and buffers of bicarbonate, phosphate or borate as the immobile phase.

For practical use as a feed additive for live-stock, the product isolated from the culture medium by extraction and precipitation may be used without further purification.

In the following examples there are described several preferred embodiments to illustrate the invention.

However, it should be understood that the invention is not intended to be limited to the specific embodiments.

EXAMPLE I.

The microorganism *Streptomyces ramocissimus* (CBS 190.69) was fermented in 2,000 liters of a medium containing 20 g. of malt paste, 10 g. of yeast extract and 5 g. of corn steep solids per liter at a pH of about 7 with agitation and aeration. After fermentation, the culture medium was mixed with about 2% of dicalite as filter aid, and the mixture was filtered. The filtrate was acidified with 8N sulfuric acid to pH 6.0 and extracted twice with one-fifth of its volume of methyl isobutyl ketone and emulsions formed were broken with Hyflo Supercel filter aid. The organic liquids were mixed and concentrated to about 1 liter by evaporation under reduced pressure and evaporation with a rotary evaporator. The concentrate formed was slowly added to 5 liters of petroleum ether (boiling range of 40°C to 60°C.) and the precipitate formed was filtered off with a glass filter (D 3), washed with fresh petroleum ether and dried to obtain a yield of 78 g. of a yellow colored powder.

Using partition chromatography, 2 g. of the crude antibiotic (in the acid form) was purified. The stationary phase used consisted of Hyflo impregnated with a 0.1 molar $Na_2CO_3/NaHCO_3$ buffer at pH 11, and the mobile phase consisted of a mixture of petroleum ether and butyl acetate. A yield of 0.828 g. of the purified anitbiotic having the physico-chemical properties hereinbefore described was obtained.

A certain amount of the antibiotic was dissolved in water with addition of 0.1 N sodium hydroxide to pH 9 until a saturated solution was obtained. The solution was filtered and evaporated azeotropically with addition of butanol, and the butanolic residue was collected in a small amount of anhydrous butanol (in vacuo at about 45°C.). To the stirred solution, petroleum ether was added dropwise until all the salt was precipitated. The precipitate was filtered off, washed and dried to give the sodium salt of the antibiotic.

According to another feature of the invention there are provided animal feedstuffs, more especially in a form for use in feeding cattle, pigs and poultry, supplemented by a significant proportion of the antibiotic or a non-toxic, pharmaceutically acceptable salt, e.g. sodium salt, thereof. The antibiotic or salt thereof may also be dispersed in, or mixed with, any suitable inert physiologically innocuous carrier or diluent, which is orally administrable to an animal, nonreactive with the antibiotic and not harmful to the animals on oral administration. The antibiotic or said salt thereof may be conveniently incorporated in the feedstuff, carrier or diluent by conventional methods such as milling, stirring, or tumbling. Concentrates and supplements including the antibiotic, which may be mixed with other components of animal feedstuff, are also within the invention. Generally the amount of antibiotic or salt thereof included in an animal feedstuff to give a satisfactory growth-promoting effect is about 1 ppm. to 50 ppm. by weight of the feedstuff. The following Examples illustrate the growth promoting effect of the antibiotic.

EXAMPLE II

Slaughter chickens are given the antibiotic, in the form of the sodium salt obtained in Example I, in a mixture with a component of the feed (wheat flour), the amount of antibiotic in the feed (based on the weight of the feed) being as specified in the following Table, which gives the weight of the chickens after 3, 5 and 7 weeks.

TABLE VI

| Age | 3 weeks % increase | 5 weeks % increase | 7 weeks % increase |
|---|---|---|---|
| Control (0ppm) | 100 | 100 | 100 |
| 5 ppm | 104 | 103 | 103 |
| 10 ppm | 107 | 105 | 104 |
| 20 ppm | 109 | 107 | 105 |

The table shows that an increase in growth of the chickens is obtained upon administration of the antibiotic and an improvement of feed conversion of 3 to 5% is reached for the chickens in 7 weeks when the feed contains 1–50 ppm of antibiotic.

EXAMPLE III

The sodium salt of the antibiotic, as obtained in Example I, was pre-mixed with wheat flour which mixture, added to the feed, was administered to pigs. The amount of the antibiotic present in the feed (based on the weight of the feed) is given herebelow in Table VII, in which the average relative weights of the pigs after 6 and 12 weeks, respectively, are given.

TABLE VII

| antibiotic | 6 weeks | | 12 weeks | |
|---|---|---|---|---|
| | growth | feed conversion | grown | feed conversion |
| 0 ppm (control) | 100 | 100 | 100 | 100 |
| 5 ppm | 107 | 95 | 104.5 | 98 |
| 10 ppm | 108.5 | 92.5 | 104 | 99 |

The Table shows a growth promoting effect of the antibiotic according to the invention.

Various modifications of the composition and methods of the invention may be made without departing from the spirit or scope thereof and it is to be understood that the invention is to be limited only as defined in the appended claims.

We claim:
1. A member of the group consisting of the antibiotic MYC 8003, which is a yellow, salt-forming weak acid solid having the analysis: carbon, 63.8%; hydrogen, 7.6%; nitrogen, 3.5%; and oxygen, 25.1%; consisting of equilibrium-forming components, with an optical rotation $[\alpha]_D^{22}$ of $-60°$ (1% methanolic solution), poorly soluble in carbon tetrachloride and benzene, soluble in chloroform, methyl isobutyl ketone, butyl acetate, ethyl acetate, methanol and alkaline solutions, insoluble in diethyl ether, petroleum ether, water and acid solutions, showing a slightly positive reaction in the aromate test, forming a red color with concentrated sulfuric acid, a dark brown color in the Pauly reaction, a dark red color and turbidity with ferric chloride, and precipitation with bromine water, showing gas production at 135°C, showing further gas production at about 152°C and showing a decomposition at 164°–174°C, showing in the ultraviolet region of the spectrum absorption maxima at 233, 276, 286, and 327 nm as in FIG. 1, and in the infrared region, in KBr, absorption bands at 812, about 860, 940, 985, 1092, 1215, 1340–1380, 1460, 1540, 1640, 2933, 2969 and about 3370 $cm^{-1}$ as in FIG. 3 and an Rf-value of 0.10 of the chief component, when chromatographed with a mixture of benzene, ethanol and 33% ammonia in the ratio of 65:40:9 and having the PMR spectrum of FIG. 4, and its non-toxic, pharmaceutically acceptable salts.

2. The antibiotic of claim 1 in the form of its sodium salt.

3. A process for the production of the antibiotic MYC 8003 of claim 1 which comprises cultivating the microorganism *Streptomyces ramocissimus* (CBS 190.69) in an aqueous nutrient medium containing assimilable sources of carbon, nitrogen and inorganic substances until substantial antibiotic activity is imparted to said medium by antibiotic MYC 8003 and recovering the antibiotic formed during the cultivation.

* * * * *